UNITED STATES PATENT OFFICE.

LOUIS BENOIT, OF BARMEN, GERMANY.

METHOD OF TRANSFERRING DRAWINGS TO STONES, &c.

SPECIFICATION forming part of Letters Patent No. 493,812, dated March 21, 1893.

Application filed October 29, 1890. Serial No. 369,721. (No specimens.) Patented in Germany July 14, 1890, No. 55,612, and in France September 19, 1890, No. 195,145.

*To all whom it may concern:*

Be it known that I, LOUIS BENOIT, lithographer, a subject of His Majesty the Emperor of Germany, residing at Barmen, in the Province of Rhenish Prussia, Germany, have invented certain new and useful improvements in the method of transferring drawings upon stone without using transferring ink and restoring the sensibility of the stone by treatment with acid and sulphate of alumina without pumicating the drawing (for which I have received Letters Patent in Germany, No. 55,612, dated July 14, 1890, and in France, No. 195,145, dated September 19, 1890;) and I do hereby declare that the following is a full, clear, and exact description of the invention, which will enable others skilled in the art to which it appertains to make and use the same.

I make the stone which has received an even surface sensitive for the slightest trace of fat by treating it as follows for producing the transfers: I wash with turpentine and weak nitric acid, then I rub it with stronger acid and a solution of gum and then I wash it with clean water and dry it; then I wet it with a solution of eighty grams sulphate of alumina in one liter of water, in consequence of which a layer like ice will appear after a minute or two and then I wash off with pure water and dry it again and the stone is ready for a new drawing or for a transfer respectively, and is further treated in the usual manner employed by lithographers, that is to say, it follows: the transferring with ordinary ink, then gumming and washing, rolling up the design with common ink, powdering with rosin and finally etching and gumming. The rubbing with the nitric acid must be done quickly that the same does not attack the stone and in support of this a little gum is added thereto. The sulphate of alumina has the effect of restoring the stone after it has been treated with acid and renders the aciduous surface into the natural state of carbonate of lime; it neutralizes the acid. It is to be observed that the sulphate of alumina must be free of iron.

A stone prepared according to my manner having served its purpose and which then shall be used again for a new drawing is washed with turpentine and any fat, which may have been left, is destroyed by the use of acid and thus the stone is made sensitive again for new fat and is ready for a new drawing without the old one having been destroyed by pumicating. Ten to twenty minutes are sufficient to restore a stone of any size. This however is not the only and not the principal advantage of my method; the same allows, without difficulty, to lay a second design, for instance hatchings or other designs, over the first, because the stone has been made sensitive for a second drawing, without injuring the first in the least, and with absolute security. Therefore one is enabled to lay two and more drawings one above the other and to reproduce the same in one proof.

In consequence of the peculiar manner of preparing the stone the same receives a surface not polished but somewhat granulous, retaining the finest line or dot and reproducing it equally fine.

A shortened and simplified method has been invented formerly, but one of its principal conditions is, that the stone must be pumicated, after one design has been printed from it, if it shall then be made fit for a second design. It is not possible to print two designs in one operation or at any rate with uncertainty only, and by taking the most extraordinary care, of the first design and by avoiding every other operation with the stone.

The methods hitherto in use all start with pumicating the stones, an operation absolutely excluded from my method; it is therefore not possible by the old methods to transfer two or more drawings one upon the other and to reproduce the same in one proof.

Having fully described my invention, what I claim, and desire to secure by Letters Patent, is—

The improvement in the art of treating lithographic stone which consists in treating the surface of the clean stone with a solution of sulphate of alumina substantially as described.

LOUIS BENOIT.

Witnesses:
 CHAS. KRUEGER,
 RUDOLPH FRICKE.